W. SWATHEL.
Bolt-Heading Machine.
No. 71,243.  Patented Nov. 19, 1867.
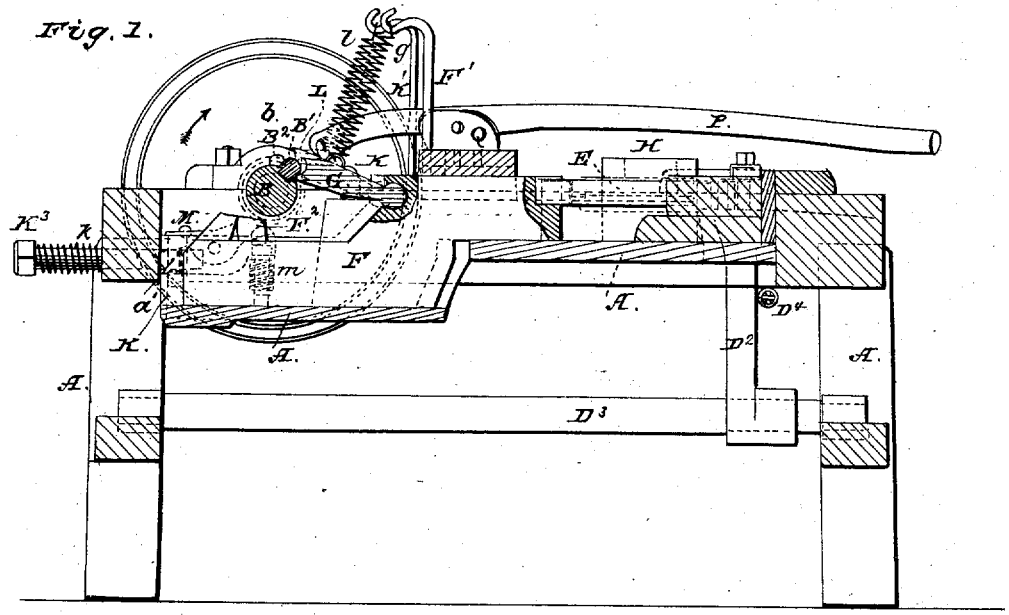
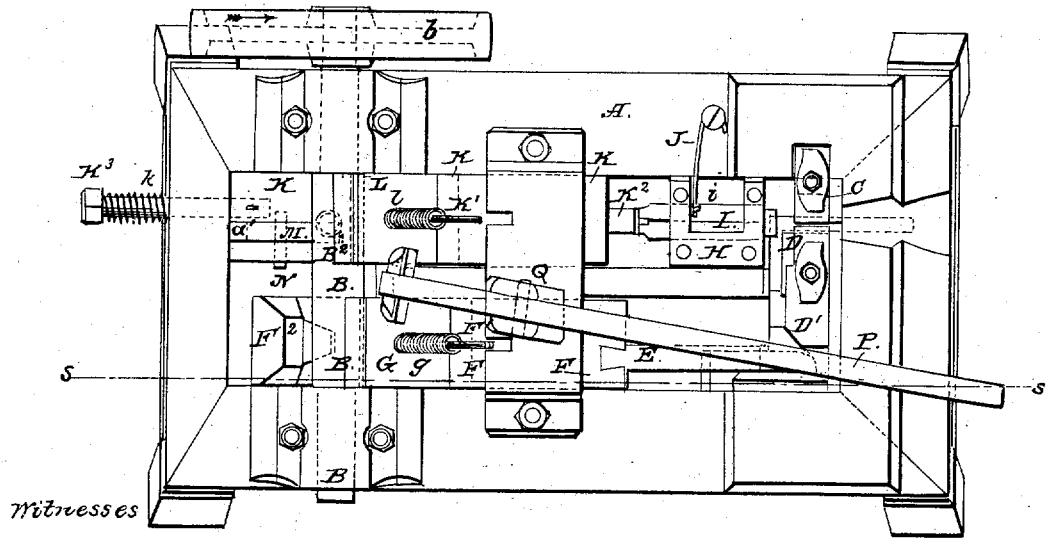

United States Patent Office.

WILBER SWATHEL, OF SOUTHINGTON, CONNECTICUT, ASSIGNOR TO W. J. CLARK, H. H. CLARK, AND C. H. CLARK, OF SAME PLACE.

Letters Patent No. 71,243, dated November 19, 1867.

IMPROVED MACHINE FOR HEADING BOLTS.

*The Schedule referred to in these Letters Patent and making part of the same.*

TO ALL WHOM IT MAY CONCERN:

Be it known that I, WILBER SWATHEL, of Southington, in the county of Hartford, and State of Connecticut, have invented certain new and useful Improvements in Machines for Making Bolts; and I do hereby declare that the following is a full and exact description thereof.

My machine belongs to the class in which the bolts are received in the form of round bars of iron a little longer than the finished bolt. These bars are heated in a suitable furnace, and are introduced into the machine one by one, by hand or otherwise, and are seized and firmly held in the machine by means of dies, while one end, which is allowed to project beyond the portion grasped by the dies, is compressed against the dies, and formed into a head. The head, as also the shank or portion grasped by the dies, may vary in form according to the form of those portions of the dies and header which are impressed upon the heated metal.

I will first describe what I consider the best means of carrying out my invention, and will afterwards designate the points which I believe to be new. The accompanying drawings form a part of this specification.

Figure 1 is a longitudinal section, and

Figure 2 is a plan view of the machine.

Similar letters of reference indicate like parts in all the figures. Tints are employed merely to aid in distinguishing parts, and do not indicate material. The material of the whole machine may be iron and steel.

A is a fixed framing. B is a stout shaft, rotating in suitable bearings in the frame A, and driven by a steam engine or other motive power applied to the wheel $b$. $B^1$ and $B^2$ are stout projections formed on the shaft B, as represented, and by means of which all the operating parts of our machine are moved forward, in order to compress the hot metal. The shaft B rotates in the direction indicated by the arrow, and the projection $B^1$ stands one side of and a little in advance of the projection $B^2$. Both are wide, and are adapted to afford ample bearing surface, to exert a great force on the pieces against which they act. The projection $B^1$ causes the closing of the dies to hold the bars, and the projection $B^2$ compresses the head of the bolt.

C is the fixed die, which is firmly fixed in the framing A by any approved means. D is the moving die. It is mounted in the enlarged head $D^1$ of the vertical arm $D^2$, which is fixed on the rocking-shaft $D^3$, supported below, as represented. The moving die D moves towards and from the stationary die C, and the ends of C and D are grooved, to match the shank of the bolt. If it is desired that the shank be round, the grooves are semi-cylindrical. If the shank is to be square, or of any other form, the grooves are correspondingly shaped.

The back face of the enlarged head or die-carrier $D^1$ is bevelled, as represented, and is acted upon by the slide E, which is correspondingly bevelled, and is alternately thrust into and withdrawn from the space between the head $D^1$ and the smooth surface $a$, on the adjacent portion of the frame A. This slide E is an extension of a larger slide, F, which is supported in strong guides, as represented, and carries a half-toggle, or, as it is termed in the shop, a clapper, G, constructed and arranged as represented. It is drawn upward by the spring $g$, which connects it with the rigid arm $F^1$, which is fixed on the slide F, as represented.

When the machine is in operation, each revolution of the shaft B brings the projection $B^1$ in contact with the back end of the clapper G, and drives forward the clapper G and its connections, thus wedging the slide E into the space between the surface $a$ and the die-carrier $D^1$, and forcing the die D into close contact with the die C. After this movement is effected, the projection $B^1$ disconnects itself from the clapper G, and the latter rises rapidly, in obedience to the spring $g$. The further revolution of the shaft B brings the projection $B^1$ in contact with a portion, $F^2$, of the slide F, and moves the whole slide F, and its connections, back to its original position. This movement withdraws the slide E from its position behind the die-carrier $D^1$, and the latter, with its contained die, D, then immediately resumes its original position, in obedience to the force of the spring $D^4$.

H is a housing, which contains the sliding header I, and allows it to play forward and backward. J is a spring, acting on the header I, through the medium of the hook $i$ or an equivalent connection, and exerting a force tending to hold the header I always a sufficient distance back, or out of contact with the dies C D, to allow the bolt to project through the dies for a proper distance to afford material for the head. Each of the short bars of iron from which the bolts are formed is introduced in the position indicated in red outline in the drawing, and is thrust through the grooves in the dies C and D until its end abuts against the header I. The closing of the dies C and D by the means above explained seizes the bolt very firmly between the dies C and D while the heading operation is performed.

The heading is effected by the projection $B^2$, through the following means: K is a large slide, mounted in strong guides, as represented, and carrying a half-toggle or clapper L, which is held up by the spring $l$, which connects it to the arm $K^1$, fixed on the slide K, as represented. The projection $B^2$ acts on the rear end of the clapper L, and drives forward the slide K and its connections at the proper time, a little after the dies C and D have closed together. The forward movement of the slide K induces a corresponding movement of the header I, by acting directly against the rear end of the latter, in a manner which will be readily understood. The projection $K^2$, which extends forward from the slide K, to act against the rear end of the header I, may be made adjustable by any convenient means, so as to vary the extent to which the header I is driven forward. It will be understood that all the parts of the mechanism are adapted to be readily removed, to be repaired, and to be adjusted, as the exigencies of the work may require. The housing H may be moved to vary the quantity of material allowed to the head, or the motion of the header I may be varied within the desired limits.

I provide means for bringing my heading slide K and its connections back very rapidly after its duty is performed, and yet to hold it forward for a sufficient period to allow the clapper L to rise after it is liberated from the projection $B^2$. $K^3$ is an extension of the slide K, which plays through the rear end of the framing A, and is encircled by a coiled spring, $k$, arranged as represented. This spring exerts a sufficient force to bring back the slide K and its attachments rapidly to its original position, whenever it is freed. The forward movement of the slide K compresses the spring $k$, and the tension thus accumulated is subsequently used to draw back the slide K and its connections. But this movement is not allowed to take place immediately on the separation of this projection $B^2$ from the clapper L.

A detention for a brief period is provided by the intervention of a catch, M, which is mounted, as represented, on or near the rear end of the slide K, and is free to tilt within certain limits on the fulcrum-pin N. Its front end is pressed upward by the force of a spring, $m$, which is concealed in a cavity in the slide K, as represented in dotted lines. When the slide K and its connections are moved forward to their fullest extent by the action of the projection $B^2$ on the clapper L, the rear end of the catch M drops, and catches against a projection, $a'$, which is arranged on the framing $A^2$, as represented in dotted lines in fig. 1, and by means of the catch M holds the header in the forward position until the catch is moved. At the proper period in the rotation of the shaft B, the projection $B^2$ strikes on the front end of the catch M, and pressing it downward against the tension of the spring $m$, it raises the rear end of the catch M until it is out of contact with the projection $a'$. When this movement is effected, the slide K and its connections move back rapidly in obedience to the force of the spring $k$, and the header I promptly follows it, in obedience to the force of the spring J, and releases the head of the bolt.

The construction and arrangement of the several parts as above described insures a very efficient action of the dies and header when in contact with the bolt, while it effects the proper movements with very little expenditure of power in friction, and it carries the header backward very promptly, so as to allow the greatest possible time in which to properly introduce the blank for the next bolt. The ordinary mechanism employed for effecting movements analogous to the movement of my die D, so as to maintain the hold of the dies on the body of the bolt for a considerable period, would subject the mechanism to some degree of friction during the entire period. My apparatus very greatly relieves the machinery from friction by forcing forward the slide E only to such extent as is necessary to carry the die D up to its proper position, and then allowing it to remain there, simply held as represented, allowing the mechanism to revolve freely until the period arrives for withdrawing the slide E by the action of the projection $B'$ on the part $F^1$. The same advantage belongs in some degree to the arrangement for operating the header, and holding it forward.

I believe that I derive a very marked advantage from the separation of the header I from the slide K, in the manner represented. The header I serves both as the header and as the gauge to graduate the quantity of the bolt which shall project through the dies. When the projection $B^2$ first engages with the clapper L, it acts at a considerable disadvantage; but it has at that period only to overcome the inertia of the parts, and the tension of the springs $k$ $b$. As the slide K and its connections are moved forward the action becomes more direct, and the clapper L sinks nearly in a right line before the header I is struck and moved forward. It then moves forward with sufficient rapidity, and with the very great force due to the nearly straight position of the half-toggle L. The laws of the toggle-lever are too well understood by mechanics to need explanation in this respect, and I do not claim this portion of the mechanism as new.

P is a hand lever, turning on the fulcrum O, and adapted to depress both the clappers G and L, or to allow them both to rise out of the range of the action of the projections $B^1$ and $B^2$, as may be required. The machine only acts so long as the front end of the lever P is held up. The moment it is released and falls by its gravity, the clappers are raised by their springs so high that the operation of the machine is stopped, and the shaft B revolves idly.

Having now fully described my invention, what I claim as new, and desire to secure by Letters Patent, is as follows:

1. I claim, in bolt machines, the two independent clappers G and L, and the two separate projections $B^1$ $B^2$ on the shaft B, and the wedge piece E, arranged as represented, so as to operate relatively to each other and to the header and moving die, substantially as and for the purposes herein set forth.

2. I claim holding the header and slide K forward, while the clapper L rises, by the catch M or its equivalent, arranged and operating substantially in the manner and for the purpose herein specified.

In testimony whereof I have hereunto set my hand in the presence of two subscribing witnesses.

WILBER SWATHEL.

Witnesses:
SIMEON H. NORTON,
ROBT. W. BEMISS.